(12) United States Patent
Douglas et al.

(10) Patent No.: US 12,298,150 B2
(45) Date of Patent: May 13, 2025

(54) SIMULATION PLATFORM FOR VECTOR MAP LIVE UPDATES

(71) Applicant: ARGO AI, LLC, Pittsburgh, PA (US)

(72) Inventors: Timothy James Douglas, Pittsburgh, PA (US); Patrick Barone, San Francisco, CA (US); Timothy Cummings, Pittsburgh, PA (US)

(73) Assignee: Volkswagen Group of America Investments, LLC, Reston, VA (US)

( * ) Notice: Subject to any disclaimer, the term of this patent is extended or adjusted under 35 U.S.C. 154(b) by 240 days.

(21) Appl. No.: 18/072,139

(22) Filed: Nov. 30, 2022

(65) Prior Publication Data

US 2024/0175712 A1    May 30, 2024

(51) Int. Cl.
*G01C 21/00*    (2006.01)
*G01C 21/32*    (2006.01)

(52) U.S. Cl.
CPC ........... *G01C 21/387* (2020.08); *G01C 21/32* (2013.01); *G01C 21/3807* (2020.08); *G01C 21/3837* (2020.08)

(58) Field of Classification Search
CPC .............. G01C 21/387; G01C 21/3837; G01C 21/3807; G01C 21/32
See application file for complete search history.

(56) References Cited

FOREIGN PATENT DOCUMENTS

DE    102020115743 A1 * 12/2021    ......... G01C 21/3804

* cited by examiner

*Primary Examiner* — Michael D Lang
(74) *Attorney, Agent, or Firm* — Sterne, Kessler, Goldstein & Fox P.L.L.C.

(57) ABSTRACT

Disclosed herein are system, method, and computer program product aspects for simulating map update functions in an autonomous vehicle (AV) system. The system can create a simulation environment to test the AV system using data collected during regular operations of the AV system. The data comprises (1) map updating documents from a cloud service, (2) local map updating documents, and (3) observation data. A map-deviation detection mechanism is used to process the observation data.

20 Claims, 8 Drawing Sheets

SIMULATION PLATFORM FOR VECTOR MAP LIVE UPDATES

BACKGROUND

Autonomous vehicles (A Vs) typically rely on digital maps of their surroundings to operate. These maps may be generated in part using vehicles that drive on roads, and that use technology such as sensors, lidar, cameras, radar, GPS, etc. to capture and/or generate images or other data representations of their surroundings. These representations are then used to generate the maps. Once generated, the maps can be uploaded to servers that may provide them to an AV, for example by pushing them to the AV or directly downloaded to the computer system of the AV.

In general, the content of the maps at the AV is static. Once deployed to the AV, these maps are immutable until the AV downloads another version of the map. However, a problem arises when road conditions change in ways that need to be reflected on the map. Such changes may not be reflected on the map because they may be so small that they would not justify the costs (bandwidth, processing, availability, etc.) of generating another full version of the map to push to the AV, yet may be significant enough to impact driving conditions on the road. For example, installation of a single stop sign in a large geographic area may not be a sufficiently large change to justify generating another map to push to an AV, yet on its own is significant enough that if an AV does not recognize that a stop sign is installed, it could result in potentially dangerous road conditions. Accordingly, approaches are needed to allow AVs to adapt to changes in road conditions without the need to download entire new versions of maps.

SUMMARY

Aspects of this disclosure are directed to a system, methods, and a non-transitory computer readable medium that can be used to simulate map update functions in an AV system that operates an AV. In aspects, a method to simulate map update functions in the AV system can include generating a virtual environment of a map zone. In aspects, the virtual environment can include information about traffic conditions of the map zone collected during a drive test of an AV system. In aspects, the method can include transmitting a map update document to the AV system. Prior to the simulation, the map update document is stored after being transmitted to the AV system during the drive test. In aspects, the method can include checking if a base map of the map zone is updated by the AV system when the AV system receives the map update documents. In aspects, the method can include checking if the base map is updated by the AV system when the AV system detects a deviation between the virtual environment and the base map.

In aspects, a non-transitory computer readable medium can include instructions for causing a computing system to simulate map update functions in an AV system. In aspects, the instructions can include generating a virtual environment simulating a map zone, wherein the virtual environment comprises information about traffic conditions of the map zone and collected during a drive test of the AV system. In aspects, the instructions can include transmitting a map update document to the AV system, wherein the map update document is collected during the drive test of the AV system. In aspects, the instructions can include checking if the base map is updated by the AV system when the AV system receives the map update document. In aspects, the instructions can include checking if the base map is updated by the AV system when the AV system detects a deviation between the virtual environment and the base map.

In aspects, a system for simulating map update functions can include an AV system, a storage medium, and a computing system coupled to the AV system and the storage medium. In aspects, the AV system can include a processor and a sensor coupled to the processor. In aspects, the storage medium can be configured to store a map update document received by the AV system during a drive test, and store information about traffic conditions of a map zone and collected by the sensing unit of the AV system during the drive test. In aspects, the computing device can be configured to generate a virtual environment simulating the map zone, transmitting the information about traffic conditions of a map zone from the storage medium to the virtual environment and couple the AV system to the virtual environment. In aspects, the computing device can be configured to transmit the map update document from the storage medium to the AV system and check if the base map is updated by the AV system when the AV system receives the map update document. In aspects, the computing device can be configured to check if the base map is updated by the AV system when the AV system detects a deviation between the virtual environment and the base map.

Certain aspects of the disclosure have other steps or elements in addition to or in place of those mentioned above. The steps or elements will become apparent to those skilled in the art from a reading of the following detailed description when taken with reference to the accompanying drawings.

BRIEF DESCRIPTION OF THE DRAWINGS

The accompanying drawings are incorporated herein and form a part of the specification.

In the drawings, like reference numbers generally indicate identical or similar elements. Additionally, generally, the leftmost digit(s) of a reference number identifies the drawing in which the reference number first appears.

DETAILED DESCRIPTION

Provided herein are system, apparatus, device, method and/or computer program product aspects, and/or combinations and sub-combinations thereof, to update a base map of an AV, and to simulate functions of updating the base map in an AV system. The system provides a unique architecture that can be used to update the base map of the AV. A benefit of the system over conventional approaches is in simplifying how map related data is distributed to AVs and their modules. In an aspect, the system provides a pipeline to deliver map updates through a single source, which can then be distributed to the various modules of the AV. Moreover, these updates can be provided incrementally, as well as on a scheduled time or in real-time. In this way, changed road conditions can be reflected on a base map of the AV. The system further provides an effective and efficient scheme to simulate the architecture used to update the base map of the AV in a virtual environment. In an aspect, the system reduces the cost and improves the efficiency in developing, testing, refining the AV system at different manufacturing stages of the AV.

The term "vehicle" refers to any moving form of conveyance that is capable of carrying either one or more human occupants and/or cargo and is powered by any form of energy. The term "vehicle" includes, but is not limited to, cars, trucks, vans, trains, AVs, aircraft, aerial drones and the like. An AV is a vehicle having a processor, programming instructions and drivetrain components that are controllable by the processor without requiring a human operator. An AV may be fully autonomous in that it does not require a human operator for most or all driving conditions and functions, or it may be semi-autonomous in that a human operator may be required in certain conditions or for certain operations, or that a human operator may override the vehicle's autonomous system and may take control of the vehicle.

Notably, the present solution is being described herein in the context of an AV. However, the present solution is not limited to AV applications. The present solution may be used in other applications such as robotic applications, radar system applications, metric applications, and/or system performance applications.

Figure 1:
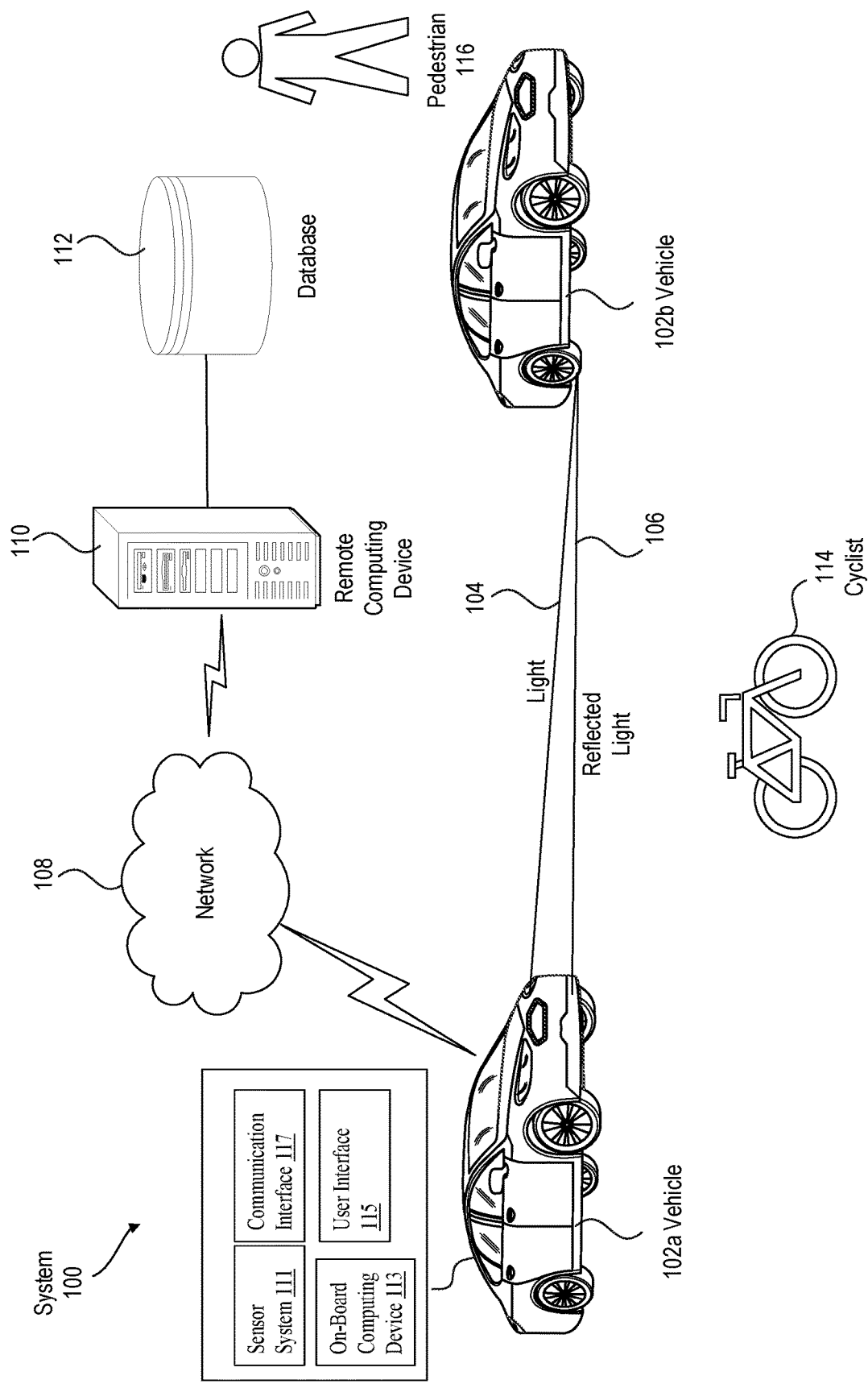
FIG. 1 illustrates an exemplary autonomous vehicle (AV) system, in accordance with aspects of the disclosure.

FIG. 1 illustrates an exemplary AV system 100, in accordance with aspects of the disclosure. System 100 comprises a vehicle 102a that is traveling along a road in a semi-autonomous or autonomous manner. Vehicle 102a is also referred to herein as AV 102a. AV 102a can include, but is not limited to, a land vehicle (as shown in FIG. 1), an aircraft, or a watercraft.

AV 102a is generally configured to detect objects 102b, 114, or 116 in proximity thereto. The objects can include, but are not limited to, a vehicle 102b, cyclist 114 (such as a rider of a bicycle, electric scooter, motorcycle, or the like) and/or a pedestrian 116.

As illustrated in FIG. 1, the AV 102a may include a sensor system 111, an on-board computing device 113, a communications interface 117, and a user interface 115. AV 102a may further include certain components (as illustrated, for example, in FIG. 2) included in vehicles, which may be controlled by the on-board computing device 113 using a variety of communication signals and/or commands, such as, for example, acceleration signals or commands, deceleration signals or commands, steering signals or commands, braking signals or commands, etc.

Figure 2:
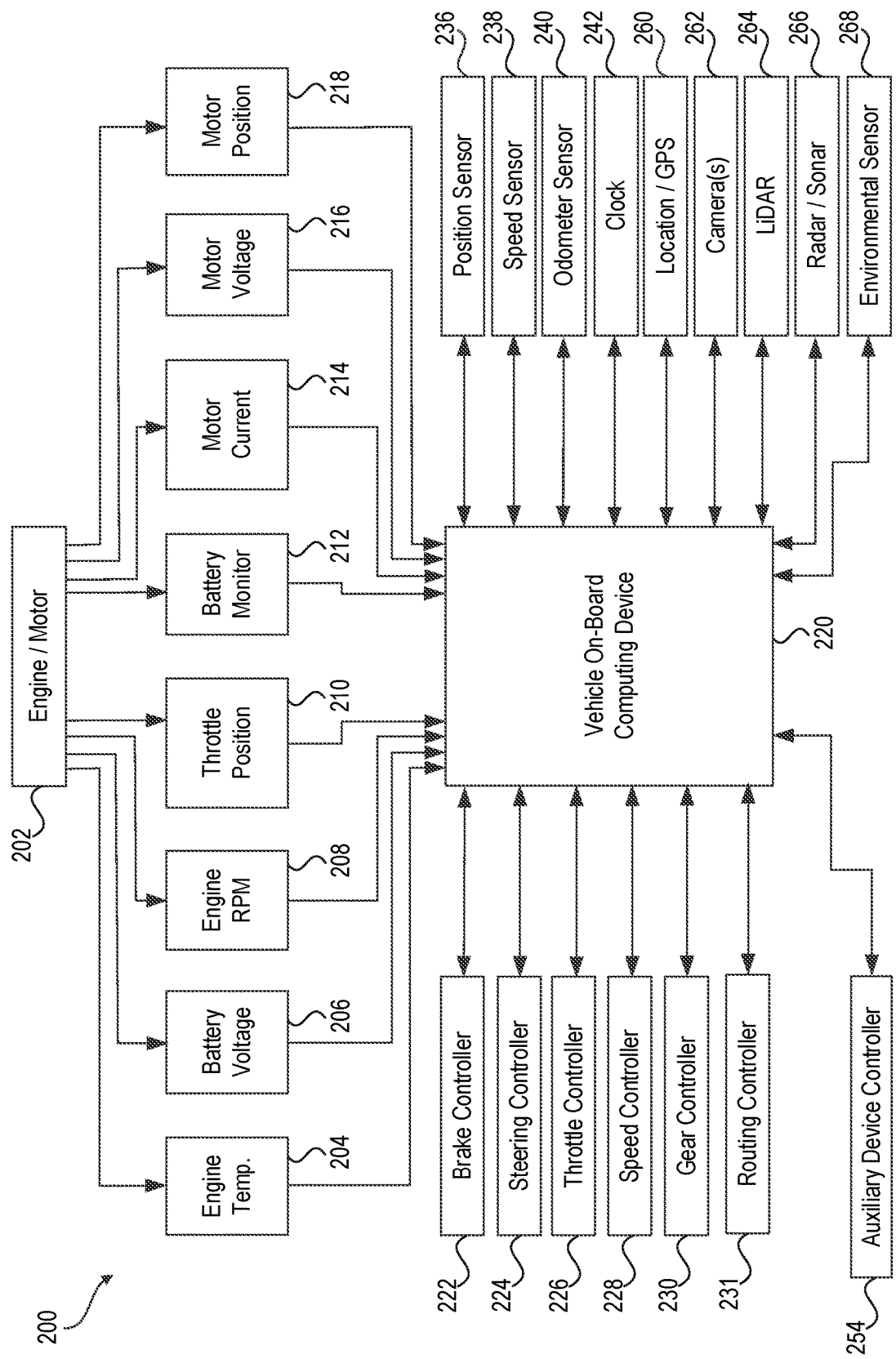
FIG. 2 illustrates an exemplary architecture for an AV, in accordance with aspects of the disclosure.

The sensor system 111 may include one or more sensors that are coupled to and/or are included within the AV 102a, as illustrated in FIG. 2. For example, such sensors may include, without limitation, a lidar system, a radio detection and ranging (RADAR) system, a laser detection and ranging (LADAR) system, a sound navigation and ranging (SONAR) system, one or more cameras (e.g., visible spectrum cameras, infrared cameras, etc.), temperature sensors, position sensors (e.g., global positioning system (GPS), etc.), location sensors, fuel sensors, motion sensors (e.g., inertial measurement units (IMU), etc.), humidity sensors, occupancy sensors, or the like. The sensor data can include information that describes the location of objects within the surrounding environment of the AV 102a, information about the environment itself, information about the motion of the AV 102a, information about a route of the vehicle, or the like. As AV 102a travels over a surface, at least some of the sensors may collect data pertaining to the surface.

AV 102a may be configured with a lidar system, e.g., lidar system 264 of FIG. 2. The lidar system may be configured to transmit a light pulse 104 to detect objects located within a distance or range of distances of AV 102a. Light pulse 104 may be incident on one or more objects (e.g., AV 102b) and be reflected back to the lidar system. Reflected light pulse 106 incident on the lidar system may be processed to determine a distance of that object to AV 102a. The reflected light pulse may be detected using, in some aspects, a photodetector or array of photodetectors positioned and configured to receive the light reflected back into the lidar system. The lidar information, such as detected object data, is communicated from the lidar system to an on-board computing device, e.g., on-board computing device 220 of FIG. 2. The AV 102a may also communicate lidar data to a remote computing device 110 (e.g., a cloud processing system) over communications network 108. Remote computing device 110 may be configured with one or more servers to process one or more processes of the technology described herein. Remote computing device 110 may also be configured to communicate data/instructions to/from AV 102a over network 108, to/from server(s) and/or database(s) 112.

It should be noted that the lidar systems for collecting data pertaining to the surface may be included in systems other than the AV 102a such as, without limitation, other vehicles (autonomous or driven), robots, satellites, etc.

Network 108 may include one or more wired or wireless networks. For example, the network 108 may include a cellular network (e.g., a long-term evolution (LTE) network, a code division multiple access (CDMA) network, a 3G network, a 4G network, a 5G network, another type of next generation network, etc.). The network may also include a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or the like, and/or a combination of these or other types of networks.

AV 102a may retrieve, receive, display, and edit information generated from a local application or delivered via network 108 from database 112. Database 112 may be configured to store and supply raw data, indexed data, structured data, map data, program instructions or other configurations as is known.

The communications interface 117 may be configured to allow communication between AV 102a and external systems, such as, for example, external devices, sensors, other vehicles, servers, data stores, databases, etc. The communications interface 117 may utilize any now or hereafter known protocols, protection schemes, encodings, formats, packaging, etc. such as, without limitation, Wi-Fi, an infrared link, Bluetooth, etc. The user interface 115 may be part of peripheral devices implemented within the AV 102a including, for example, a keyboard, a touch screen display device, a microphone, and a speaker, etc.

FIG. 2 illustrates an exemplary system architecture 200 for a vehicle, in accordance with aspects of the disclosure.

Vehicles 102*a* and/or 102*b* of FIG. 1 can have the same or similar system architecture as that shown in FIG. 2. Thus, the following discussion of system architecture 200 is sufficient for understanding vehicle(s) 102*a* and 102*b* of FIG. 1. However, other types of vehicles are considered within the scope of the technology described herein and may contain more or less elements as described in association with FIG. 2. As a non-limiting example, an airborne vehicle may exclude brake or gear controllers, but may include an altitude sensor. In another non-limiting example, a water-based vehicle may include a depth sensor. One skilled in the art will appreciate that other propulsion systems, sensors and controllers may be included based on a type of vehicle, as is known.

As shown in FIG. 2, system architecture 200 includes an engine or motor 202 and various sensors 204-218 for measuring various parameters of the vehicle. In gas-powered or hybrid vehicles having a fuel-powered engine, the sensors may include, for example, an engine temperature sensor 204, a battery voltage sensor 206, an engine Rotations Per Minute ("RPM") sensor 208, and a throttle position sensor 210. If the vehicle is an electric or hybrid vehicle, then the vehicle may have an electric motor, and accordingly includes sensors such as a battery monitoring system 212 (to measure current, voltage and/or temperature of the battery), motor current 214 and motor voltage 216 sensors, and motor position sensors 218 such as resolvers and encoders.

Operational parameter sensors that are common to both types of vehicles include, for example: a position sensor 236 such as an accelerometer, gyroscope and/or inertial measurement unit; a speed sensor 238; and an odometer sensor 240. The vehicle also may have a clock 242 that the system uses to determine vehicle time during operation. The clock 242 may be encoded into the vehicle on-board computing device, it may be a separate device, or multiple clocks may be available.

The vehicle also includes various sensors that operate to gather information about the environment in which the vehicle is traveling. These sensors may include, for example: a location sensor 260 (e.g., a Global Positioning System (GPS) device); object detection sensors such as one or more cameras 262; a lidar system 264; and/or a radar and/or a sonar system 266. The sensors also may include environmental sensors 268 such as a precipitation sensor and/or ambient temperature sensor. The object detection sensors may enable the vehicle to detect objects that are within a given distance range of AV 102*a* or 102*b* of FIG. 1, in any direction, while the environmental sensors collect data about environmental conditions within the vehicle's area of travel.

During operations, information is communicated from the sensors to a vehicle on-board computing device 220 (the same as on-board computing device 113 of FIG. 1). The on-board computing device 220 may be implemented using the computer system of FIG. 8. The vehicle on-board computing device 220 analyzes the data captured by the sensors and optionally controls operations of the vehicle based on results of the analysis. For example, the vehicle on-board computing device 220 may control: braking via a brake controller 222; direction via a steering controller 224; speed and acceleration via a throttle controller 226 (in a gas-powered vehicle) or a motor speed controller 228 (such as a current level controller in an electric vehicle); a differential gear controller 230 (in vehicles with transmissions); and/or other controllers. Auxiliary device controller 254 may be configured to control one or more auxiliary devices, such as testing systems, auxiliary sensors, mobile devices transported by the vehicle, etc.

Geographic location information may be communicated from the location sensor 260 to the on-board computing device 220, which may then access a map of the environment that corresponds to the location information to determine known fixed features of the environment such as streets, buildings, stop signs and/or stop/go signals. Captured images from the cameras 262 and/or object detection information captured from sensors such as lidar system 264 is communicated from those sensors) to the on-board computing device 220. The object detection information and/or captured images are processed by the on-board computing device 220 to detect objects in proximity to the AV 102*a* or 102*b*. Any known or to be known technique for making an object detection based on sensor data and/or captured images may be used in the aspects disclosed in this document.

The lidar information is communicated from lidar system 264 to the on-board computing device 220. Additionally, captured images are communicated from the camera(s) 262 to the vehicle on-board computing device 220. The lidar information and/or captured images are processed by the vehicle on-board computing device 220 to detect objects in proximity to the AV 102*a* or 102*b*. The manner in which the object detections are made by the vehicle on-board computing device 220 includes such capabilities detailed in this disclosure.

The on-board computing device 220 may include and/or may be in communication with a routing controller 231 that generates a navigation route from a start position to a destination position for an AV 102*a*. The routing controller 231 may access a map data store to identify possible routes and road segments that a vehicle can travel on to get from the start position to the destination position. The routing controller 231 may score the possible routes and identify a preferred route to reach the destination. For example, the routing controller 231 may generate a navigation route that minimizes Euclidean distance traveled or other cost functions during the route, and may further access the traffic information and/or estimates that can affect an amount of time it will take to travel on a particular route. Depending on implementation, the routing controller 231 may generate one or more routes using various routing methods, such as Dijkstra's algorithm, Bellman-Ford algorithm, or other algorithms. The routing controller 231 may also use the traffic information to generate a navigation route that reflects expected conditions of the route (e.g., current day of the week or current time of day, etc.), such that a route generated for travel during rush-hour may differ from a route generated for travel late at night. The routing controller 231 may also generate more than one navigation route to a destination and send more than one of these navigation routes to a user for selection by the user from among various possible routes.

In various aspects, the on-board computing device 220 may determine perception information of the surrounding environment of the AV 102*a*. Based on the sensor data provided by one or more sensors and location information that is obtained, the on-board computing device 220 may determine perception information of the surrounding environment of the AV 102*a*. The perception information may represent what an ordinary driver would perceive in the surrounding environment of a vehicle. The perception data may include information relating to one or more objects in the environment of the AV 102*a*. For example, the on-board computing device 220 may process sensor data (e.g., lidar or RADAR data, camera images, etc.) in order to identify objects and/or features in the environment of AV 102*a*. The objects may include traffic signals, roadway boundaries, other vehicles, pedestrians, and/or obstacles, etc. The on-board computing device 220 may use any now or hereafter known object recognition algorithms, video tracking algorithms, and computer vision algorithms (e.g., track objects frame-to-frame iteratively over a number of time periods) to determine the perception.

In some aspects, the on-board computing device 220 may also determine, for one or more identified objects in the environment, the current state of the object. The state information may include, without limitation, for each object: current location; current speed and/or acceleration, current heading; current pose; current shape, size, or footprint; type (e.g., vehicle vs. pedestrian vs. bicycle vs. static object or obstacle); and/or other state information.

The on-board computing device 220 may perform one or more prediction and/or forecasting operations. For example, the on-board computing device 220 may predict future locations, trajectories, and/or actions of one or more objects. For example, the on-board computing device 220 may predict the future locations, trajectories, and/or actions of the objects based at least in part on perception information (e.g., the state data for each object comprising an estimated shape and pose determined as discussed below), location information, sensor data, and/or any other data that describes the past and/or current state of the objects, the AV 102*a*, the surrounding environment, and/or their relationship(s). For example, if an object is a vehicle and the current driving environment includes an intersection, the on-board computing device 220 may predict whether the object will likely move straight forward or make a turn. If the perception data indicates that the intersection has no traffic light, the on-board computing device 220 may also predict whether the vehicle may have to fully stop prior to entering the intersection.

In various aspects, the on-board computing device 220 may determine a motion plan for the AV 102*a*. For example, the on-board computing device 220 may determine a motion plan for the AV 102*a* based on the perception data and/or the prediction data. Specifically, given predictions about the future locations of proximate objects and other perception data, the on-board computing device 220 can determine a motion plan for the AV 102*a* that best navigates the AV 102*a* relative to the objects at their future locations.

In some aspects, the on-board computing device 220 may receive predictions and make a decision regarding how to handle objects and/or actors in the environment of the AV 102*a*. For example, for a particular actor (e.g., a vehicle with a given speed, direction, turning angle, etc.), the on-board computing device 220 decides whether to overtake, yield, stop, and/or pass based on, for example, traffic conditions, map data, state of the AV 102*a*, etc. Furthermore, the on-board computing device 220 also plans a path for the AV 102*a* to travel on a given route, as well as driving parameters (e.g., distance, speed, and/or turning angle). That is, for a given object, the on-board computing device 220 decides what to do with the object and determines how to do it. For example, for a given object, the on-board computing device 220 may decide to pass the object and may determine whether to pass on the left side or right side of the object (including motion parameters such as speed). The on-board computing device 220 may also assess the risk of a collision between a detected object and the AV 102*a*. If the risk exceeds an acceptable threshold, it may determine whether the collision may be avoided if the AV 102*a* follows a defined vehicle trajectory and/or implements one or more dynamically generated emergency maneuvers performed in a pre-defined time period (e.g., N milliseconds). If the collision may be avoided, then the on-board computing device 220 may execute one or more control instructions to perform a cautious maneuver (e.g., mildly slow down, accelerate, change lane, or swerve). In contrast, if the collision cannot be avoided, then the on-board computing device 220 may execute one or more control instructions for execution of an emergency maneuver (e.g., brake and/or change direction of travel).

As discussed above, planning and control data regarding the movement of the AV 102*a* is generated for execution. The on-board computing device 220 may, for example, control braking via a brake controller 222; direction via a steering controller 224; speed and acceleration via a throttle controller 226 (in a gas-powered vehicle) or a motor speed controller 228 (such as a current level controller in an electric vehicle); a differential gear controller 230 (in vehicles with transmissions); and/or other controllers.

Vector Map Live Updates

Figure 3:
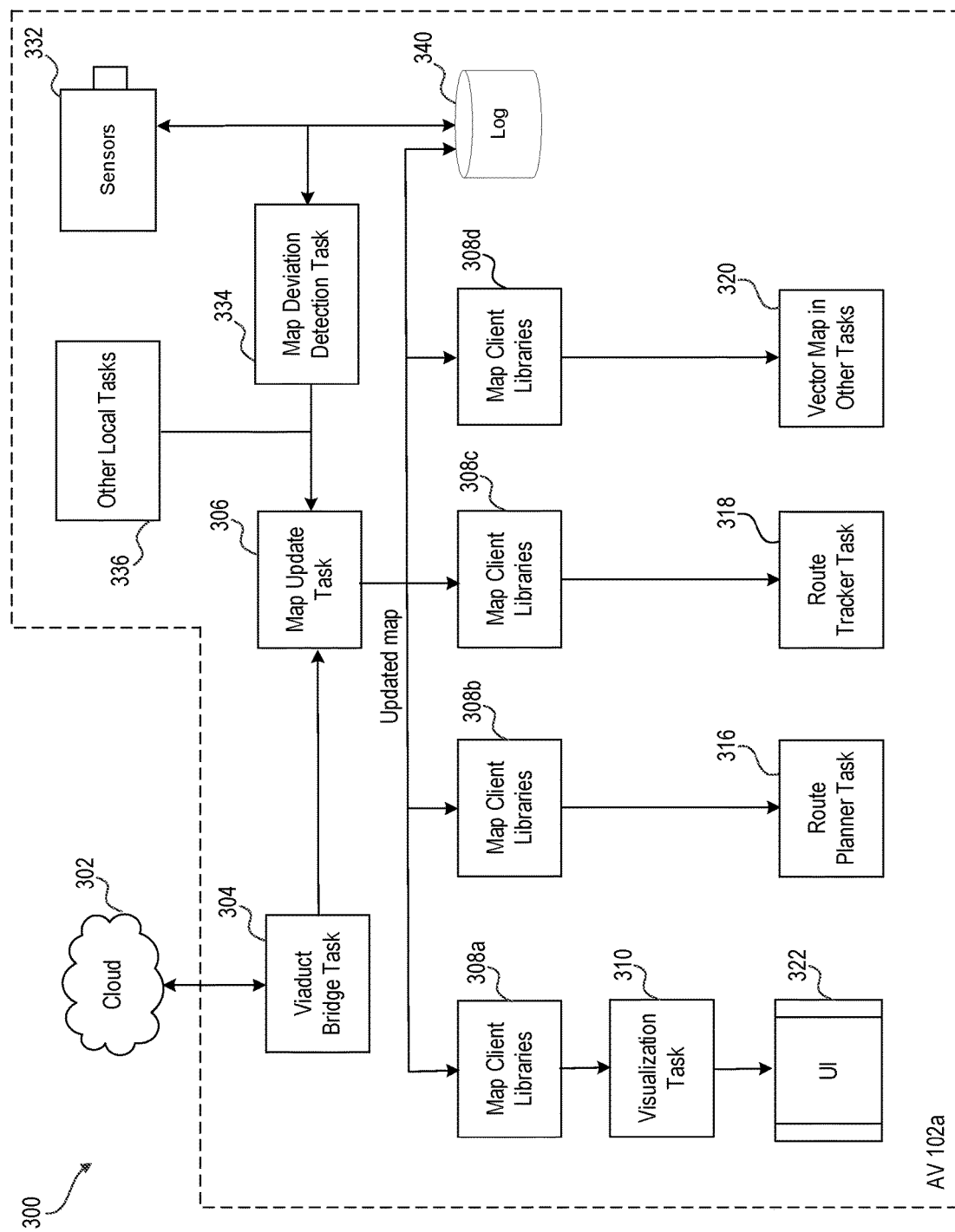
FIG. 3 is a control flow of a system for updating a base map of an AV, in accordance with aspects of the disclosure.

FIG. 3 is a control flow of a system 300 for updating a base map of an AV (e.g., AV 102*a*), in accordance with aspects of the disclosure. In aspects, the base map includes a pre-generated map that is downloaded onto the AV and is used to help the AV navigate its surroundings. In aspects, the system 300 can be implemented such that it resides wholly on the AV. In other aspects, portions of the system 300 can be implemented such that they reside on remote devices and/or servers. For example, a bridge task 304 can be implemented to serve as an interface between the AV and a cloud computing service 302. In aspects, the bridge task 304 can be a software module configured to send and receive information between the AV and the cloud computing service 302. In aspects, the bridge task 304 can receive map updates from the cloud computing service 302. In aspects, part of the functionality of the bridge task 304 can be implemented on the cloud computing service 302 and part on the AV based on a client-service architecture.

In aspects, the control flow can begin by establishing a connection between the AV and the cloud computing service 302. The cloud computing service 302 can be a service/software component or module of a cloud computing environment. The cloud computing environment may be a public or private cloud service. Examples of a public cloud include Amazon Web Services (AWS), IBM Cloud, Oracle Cloud Solutions, Microsoft Azure Cloud, and Google Cloud, as examples. A private cloud can be a cloud environment similar to a public cloud but is operated for a single organization.

In aspects, the cloud computing service 302 can be configured to store a version of the base map that can be pushed to AVs. The cloud computing service 302 can also be configured to store information about updates that need to be made to the base map. In aspects, based on (or as a part of) establishing the connection to the cloud computing service 302, the AV can identify itself to the cloud computing service 302. In aspects, this can be done by transmitting a vehicle identification number (VIN) of the AV to the cloud computing service 302. The VIN can identify the AV to the cloud computing service 302. In this way, the cloud computing service 302 can determine what specific AV is to have updates pushed to its base map. In aspects, the VIN can be associated with or linked to a particular geographic region/area. For example, the cloud computing service 302 can compare the VIN to known VINs of AVs to determine the particular geographic region/area that the VIN is registered or associated with. The particular geographic area/region will be referred to herein as a "map zone." For example, the VIN can identify the AV as being based in/located in a particular neighborhood, city, region, state, country, etc.

In aspects, the map zone can be represented on the base map and identified using map coordinates. Moreover, the map zone can have various attributes that can also be represented within the base map. These attributes can be represented as data, metadata, objects, variables, etc. within the data structure of the base map, and can be integrated into the base map and/or data files used to update the base map. Knowing which geographic area/region is associated with the AV is useful because the cloud computing service 302 can use the information to transmit relevant portions of the base map to the AV, and transmit any updates related to that particular map zone to the AV. In this way, resources are not wasted in transmitting all updates for the base map to the AV. The updates can also be sent based on tracking the AV as it traverses various geographic areas. For example, if the AV moves towards an area outside of the map zone, updates can be pushed to the base map for that area so that the AV can have the most up to date information about the area. This results in quicker and more targeted updates, and overall efficiency of the system.

In aspects, based on transmitting the VIN to the cloud computing service 302 and having the cloud computing service 302 identify the AV, the AV can receive, from the cloud computing service 302, a map update document for a map zone linked to the VIN. In aspects, this can occur whenever updates for the map zone become available. In aspects, the map update document can be transmitted as soon as an update is available, or can be based on a minimum time interval. The minimum time interval can determine the rate at which the map update document is pushed to the AV from the cloud computing service 302. For example, the minimum time interval can indicate that updates cannot be pushed to the AV until at least 5 seconds, 10 seconds, 1 minute, etc. has passed since the last update. In this way, the updates can be throttled so as to not overwhelm the AV.

In aspects, the map update document includes a computer implemented file that contains attributes of the map zone. The map update document can contain information related to the map zone and can contain any updates for the map zone. In aspects, the map update document can be implemented as a JavaScript Object Notation (JSON) file, a Protocols Buffer document, Extensible Markup Language (XML) file, or a similar file. In aspects, the attributes of the map zone can include at least: a map zone identifier, a map zone type, coordinates defining the map zone on the base map, and data specific to the map zone. The map zone identifier includes an alpha-numeric value that can be used to identify the map zone. The map zone type refers to what type of geographic area the map zone is. For example, this can be a neighborhood, city, county, region, state, etc. The coordinates defining the map zone can be, for example, GPS coordinates or custom designed map coordinates. The data specific to the map zone includes data about the road, signage, traffic, environmental, restrictions (areas to keep out of—Keep Out Zones (KOZ)) within the map zone, etc. Thus, the attributes include data identifying the map zone and data indicating information regarding the map zone, such as road conditions, environmental conditions, traffic conditions, signage within the map zone, lane restrictions, areas to avoid within the map zone, etc.

In aspects, the map update document can be received by a map update task 306 of the AV. The map update task 306 can be a software module of the AV that can process the map update document and apply the updates to the base map to obtain an updated map for the AV. In aspects, when the map update document is received by the map update task 306, a copy of the map update document is generated by the map update task 306 and stored in a log 340. In aspects, information about the map update document, such as the time the map update document is received, the source of the map update document (e. g. cloud computing service 302), the type and size of the map update document, the status of the AV (GPS coordinates, speed, direction, etc.) when receiving the map update document, etc., can also be stored in log 340. The log 340 is a storage medium that can be implemented with any number of memory units/components, such as a volatile memory, a nonvolatile memory, an internal memory, an external memory, or a combination thereof. For example, the log 340 can be a memory device, a hard drive, and a flash memory. In aspects, the log 340 can be an onboard storage instrument carried by the AV. In aspects, the log 340 can be a remote storage instrument. For example, the log 340 can be a part of the cloud computing service 302. In aspects, the map update document and the information about the map update document stored in the log 340 can be used by a simulator later in forthcoming simulations of the map update task 306 in a virtual environment.

In aspects, based on receiving the map update document, the map update task 306 can translate the map update document to a format that can be read and processed by the computing system and modules of the AV. For example, the map update task 306 can parse the map update document and generate a data structure with the attributes contained in the map update document. The data structure can be formatted in a manner in which the computing system and modules of the AV can understand and process. In aspects, this translation can include, for example, converting between coordinate systems so that the map zone can be properly identified on the base map. For example, GPS coordinates that are used to represent the map zone in the map update document can be translated to map coordinates so that the map zone can be identified on the base map.

In aspects, once the translation is complete and the data structure is generated, the resulting data structure can be applied to the base map to generate an updated map. The updated map can be a version of the base map with updated information regarding the map zone being overlaid on top of the base map. Applying the data structure to generate the updated map can be done by, for example, finding differences between attributes of the base map and attributes contained in the data structure, and when a difference is found for the same attribute, replacing the attribute of the base map with attributes contained in the data structure. By way of example, if the base map shows that there is no stop sign at an intersection, and the data structure shows that the same intersection now has a stop sign, the base map can be updated so that stop sign information is overlaid onto the base map. This is merely an example and a person skilled in the art will recognize that other attributes can be updated in this manner. For example, information related to new roads, traffic conditions, roads that are no longer accessible, etc. In aspects, this replacement would not be a wholesale replacement of the base map, but rather an overlay on top of the base map as previously indicated. In this way, the underlying base map itself is not changed, and only differences are added on top of the base map. This also adds to the efficiency of the system because only incremental changes will be pushed to the base map, increasing the speed at which the base map is updated and lessening the data that needs to be processed to reflect changes rather than a wholesale replacement of the base map.

In aspects, the map update task 306 can receive map update documents from sources different from the cloud computing service 302. For example, map update task 306 can receive map update documents according to information provided by on board sensors. In aspects, system 300 can include sensors 332. Sensors 332 can be those described with respect to FIG. 2. For example, Sensors 332 can be cameras, radar/sonar, lidar, etc. Sensors 332 can collect data about the AV's surroundings. For example, sensors 332 can be used to capture images or generate a local image of the AVs surroundings. In aspects, data provided by sensors 332 can be received by a map deviation detection task 334. The map deviation detection task 334 can be a software module of the AV that can analyze and process the data provided by sensors 332. In aspects, the map deviation detection task 334 can apply computer algorithms to capture traffic-related features in the data provided by sensors 332. For example, the map deviation detection task 334 can capture traffic-related features such as a traffic light, a speed limit sign, or a detour sign in an image taken by sensor 332. In aspects, the map deviation detection task 334 can compare the traffic-related features with the base map, and determine whether the traffic-related features deviate from the base map. For example, a deviation can be a speed limit sign in an image taken by sensor 332 but not indicated in the base map. Once a deviation is detected, the map deviation detection task 334 can generate a local map update document and transmit the local map update document to the map update task 306.

The local map update document includes a computer implemented file that contains attributes of the map zone. In aspects, the local map update document can be in the same format as the map update document received from the cloud computing service 302. In aspects, the local map update document can be in a format different from the map update document received from the cloud computing service 302. Based on receiving the local map update document, the map update task 306 can process the local map update document in a similar manner as it processes the map update document received from the cloud computing service 302. For example, the map update task 306 can parse the local map update document and generate a data structure with the attributes contained in the local map update document, and apply the data structure to the base map to generate an updated map.

In aspects, data collected by sensors 332 can be copied and stored in the log 340. For example, the images about the AV's surroundings captured by sensors 332 can be copied and stored in the log 340. In aspects, related information about the data collected by sensors 332, such as the time the data is collected, the source of the data (e. g. sensors 332), the type and size of the data, the status of the AV (GPS coordinates, speed, direction, etc.) when the data is collected, can also be stored in the log 340. In aspects, the data collected by sensors 332 and the related information about the data stored in the log 340 can be used by a simulator later in forthcoming simulations of the map update task 306 in a virtual environment.

In aspects, the map update task 306 can receive other map update documents from sources other than the cloud computing service 302 and sensors 332. For example, the map update task 306 can receive map update documents according to instructions input by a driver. In aspects, system 300 can include other local tasks 336 to provide other map update documents for updating the base map. Other local tasks 336 can be software modules of the AV that can analyze and process the map update information provided by other inputs, for example, by a user interface which allows the driver to input map update information according to the driver's observation when operating the AV. According to the map update information, other local tasks 336 can generate other map update documents and transmit them to the map update task 306. In aspects, other map update documents can be in the same format as the map update document received from the cloud computing service 302.

Based on receiving the other map update documents, the map update task 306 can process other map update documents in the same manner as it processes the map update document received from the cloud computing service 302. For example, the map update task 306 can parse other map update documents and generate data structures with the attributes contained in other map update documents, and apply the data structures to update the base map.

In aspects, once the map update task 306 receives the other map update documents, other map update documents can be copied and stored in the log 340. In aspects, information about the other map update documents, such as the times other map update documents are received, the sources of other map update documents, the types and sizes of other map update documents, the status information of the AV when receiving other map update documents, etc., can also be stored in log 340. In aspects, other map update documents and the information about other map update documents stored in log 340 can be used by a simulator later in forthcoming simulations of map update task 306 in a virtual environment.

In aspects, once the updated map is generated it can be transmitted to downstream modules of the AV to utilize the updated map to operate the AV. These downstream modules include software and/or hardware components of the AV that utilize the updated map to operate the AV. Examples of such modules can include a visualization task 310, a route planner task 316, a route tracker task 318, and other tasks 320 (e.g., vehicle guidance systems, trajectory prediction modules, etc.). For example, the visualization task 310 can be a module or set of modules that can be used the update map generate graphics to be displayed on a user interface (UI) 322 of the AV to display the updated map. The route planner task 316 can be a module or set of modules that can use the updated map to generate routes for the AV based on destination inputs. The route tracker task 318 can be a module or set of modules that can use the updated map to track the routes of the AV and work in conjunction with the route planner task 316 to modify any routes being traversed/travelled by the AV. The other tasks 320 include various other tasks that need map functionality, which a person of skill in the art would recognize.

In aspects, the transmitting to the downstream modules can be done based on a subscription model in which the downstream modules subscribe to map client libraries 308 that are configured to push the updated map to the downstream modules when the updated map is generated. The map client libraries 308 include a software and/or hardware component of the system 300 that coordinates the pushing of the updated map to the downstream modules. This can be done via application programming interfaces (APIs) that can be implemented on the map client libraries 308 and interfaced with by the downstream modules to receive the updated map. In aspects, each downstream module can have its own map client task. In FIG. 3, the various map client libraries are shown as {308a, 308b, 308c, 308d}. Based on the number of downstream modules, this number can be variable. Thus, if any particular downstream module needs to have updates provided based on a custom schedule or format, its associated map client task can be configured to implement this custom schedule or format.

In aspects, transmitting the updated map to the downstream modules can be done in real-time after the updated map is generated. Real-time refers to transmitting the updated map within seconds or milliseconds of when the updated map is generated. In aspects, transmitting the updated map to the downstream modules can be based on a scheduled time interval. For example, the scheduled time interval can indicate that the updates are received every 'X' seconds or minutes, where 'X' is a real number. The benefits of transmitting the updated map in real-time is that the AV can know of any updates to the road conditions of the map zone near instantly from when they are detected or become available to the AV. The benefits of transmitting the updated map based on a scheduled time interval is that the updates can be provided in a predictable and measured manner to avoid overloading the AV with constant updates. Depending on the priority that the update needs to be reflected to the base map of the AV, each map client task can implement the specific manner in which to transmit the updated map.

Figure 4:
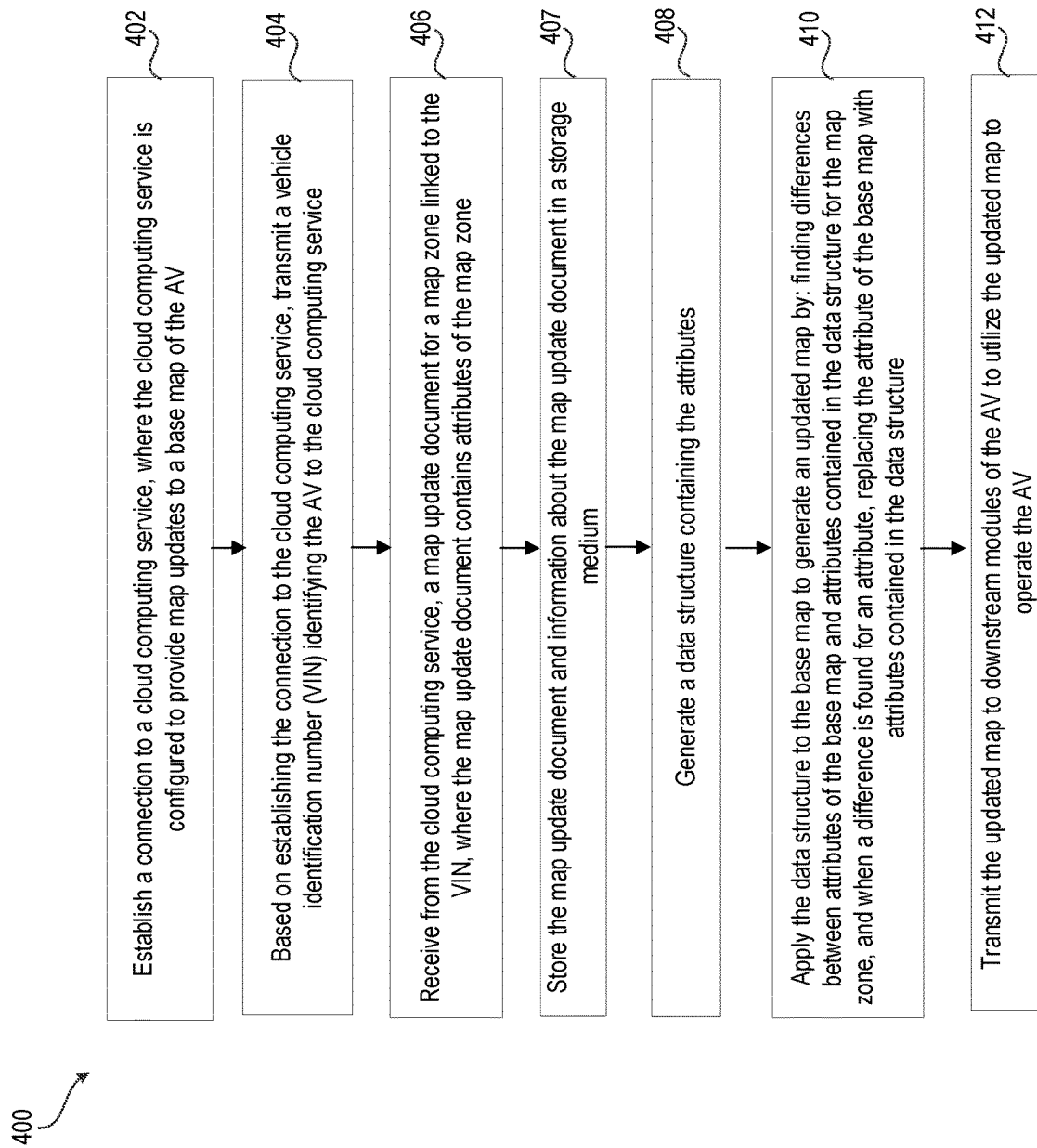
FIG. 4 is a flow chart illustrating steps for updating a base map of an AV, in accordance with aspects of the disclosure.

FIG. 4 is a flow chart illustrating steps of an example method 400 for updating a base map of the AV (e.g., AV 102a), in accordance with aspects of the disclosure. Method 400 may be performed by the components and modules of system 300. For example, the on-board computing device 113 and/or 220 can store instructions on a non-transitory computer readable medium, and have one or more processors to execute the stored instructions to implement method 400. Moreover, the various components described in FIG. 2 can be used in conjunction with and/or to support implementation of method 400.

Method 400 can comprise a series of steps. As shown in FIG. 4, and at step 402, in aspects, one or more computing devices of the AV can establish a connection to a cloud computing service 302, where the cloud computing service 302 is configured to provide map updates to a base map of the AV.

At step 404, based on establishing the connection to the cloud computing service 302, a vehicle identification number (VIN) identifying the AV may be transmitted to the cloud computing service 302. This VIN can be used to tie a map update received from the cloud computing service 302 to the particular AV, in order to determine a corresponding map zone linked to the VIN.

At step 406, the AV can receive a map update document from the cloud computing service 302. In accordance with aspects of the disclosure, the map update document can be for a map zone linked to the VIN, where the map update document contains attributes of the map zone. The AV can store the map update document and information about the map update document in a storage medium at step 407. In aspects, the map update document and information about the map update document stored in the storage medium can be transferred to a simulation later and used for simulations of method 400 in a virtual environment.

At step 408, a data structure can be generated containing the attributes, which can be applied to the base map to generate an updated map at step 410, in accordance with aspects of the disclosure. The data structure can be applied by, for example, finding differences between attributes of the base map and attributes contained in the data structure for the map zone, and when a difference is found for an attribute, replacing the attribute of the base map with attributes contained in the data structure.

Once generated, the updated map can be transmitted to downstream modules (e.g., 310, 316, 318, 320) of the AV to utilize the updated map to operate the AV, as provided at step 412.

System 300 described above provides a unique architecture that can be used to update the base map of the AV that simplifies how map related data is distributed to AVs and their modules. It provides a pipeline to deliver map updates through a single source, which can then be distributed to the modules of the AV. Moreover, these updates are provided incrementally and can be provided to the map based on a scheduled time or in real-time. In this way, changed road conditions can be reflected on a base map of the AV. The incremental nature of the updates allows the AV to conserve bandwidth in communicating updates because smaller updates can be received over a period of time, therefore not overwhelming the AV with updates. Moreover, these incremental updates allow for quicker deployment of map updates. This is particularly useful in situations where the updates are small but important. For example, if a stop sign is installed at an intersection, this change alone may not be large enough to justify creating a new map, but can be pushed to the base map quickly to avoid a situation where the AV misses the stop sign because it is not reflected in the base map.

Figure 5:
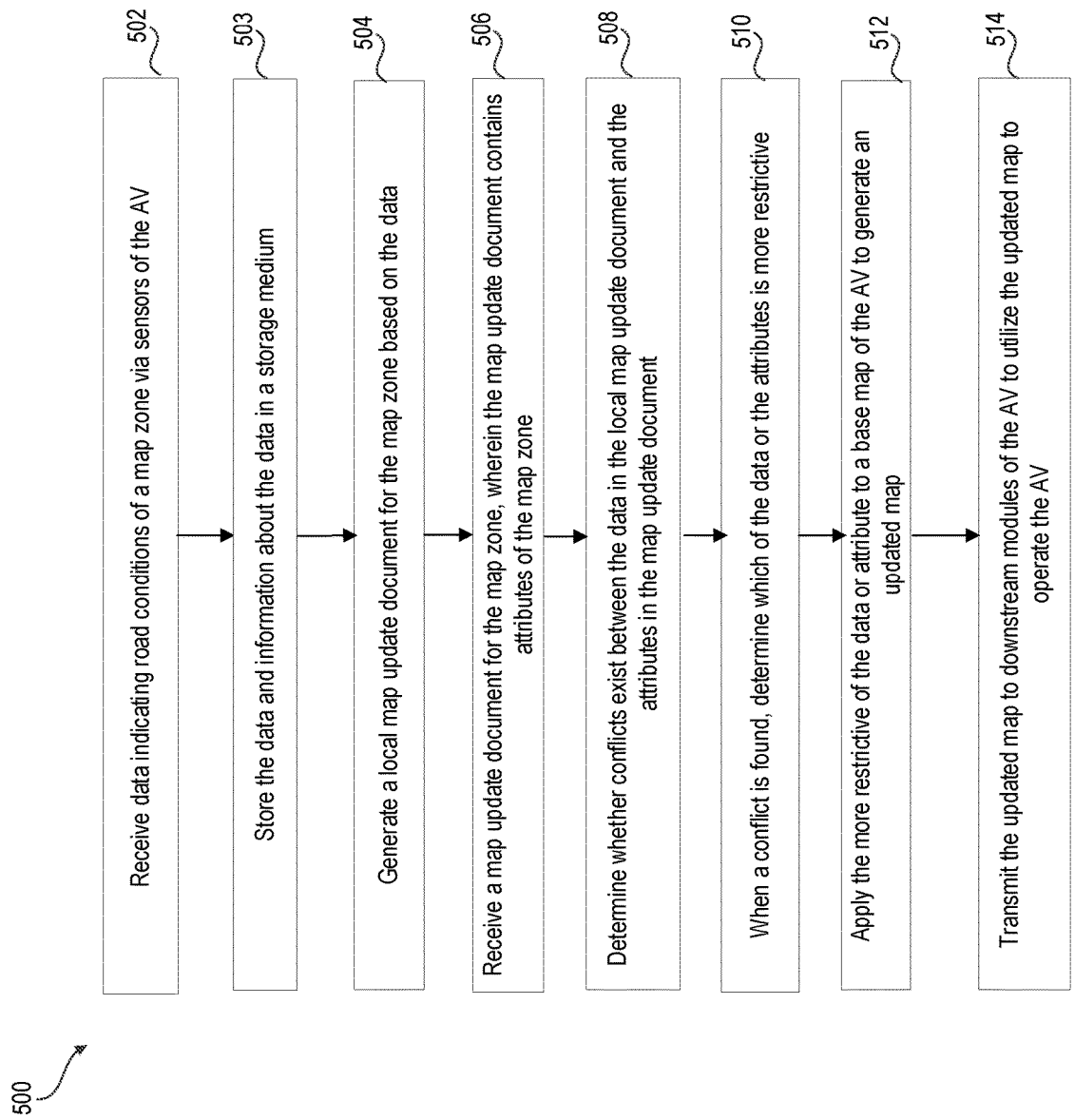
FIG. 5 is a flow chart illustrating steps for updating the base map by integrating data collected by sensors of the AV, in accordance with aspects of the disclosure.

FIG. 5 is a flow chart illustrating steps of a method 500 for updating the base map by integrating data collected by sensors 332 of the AV (e.g., AV 102a), in accordance with aspects of the disclosure. The AV can generate map updates that can be integrated and/or consolidated into the map updates pushed to the AV by the cloud computing service 302. In this way, real-time information about the AVs surroundings can also be accounted for when generating map updates. Additionally, and as a result, the AV can become part of the system that generates map updates. Thus, the AVs themselves can facilitate the creation and provision of map updates.

Method 500 may be performed by the components and modules of system 300. For example, the on-board computing device 113 and/or 220 can store instructions on a non-transitory computer readable medium, and have one or more processors to execute the stored instructions to implement method 500.

Method 500 can comprise a series of steps. In aspects, the AV can generate map updates by first receiving data indicating road conditions of a map zone via sensors of the AV at step 502.

At step 503, the AV can store the data and information about the data in a storage medium. In aspects, the data and information about the data stored in the storage medium can be transferred to a simulation later and used for simulations of the method 500 in a virtual environment. At step 504, the AV can generate a local map update document for the map zone based on the data collected. The local map update document can be similar to the map update document previously discussed except that the data it contains originates from the sensors of the AV. At step 506, the AV can also receive a map update document for the map zone, where the map update document contains attributes of the map zone. The map update document can be the same map update document previously mentioned and sent by the cloud computing service 302 to the AV. At step 508, a determination can be made whether conflicts exist between the data in the local map update document and the attributes in the map update document. A conflict can be a discrepancy between the local map update document and the map update document. For example, one document can indicate a road is mapped with a 35 mph speed limit, a map update might reduce that to 30 mph, but then a local map update could detect a speed limit sign saying 25 mph for the same road. In this case, 25 mph is the most restrictive so that is the speed limit used in the updated map. Another example is where one document indicates a road closure while the other does not for the exact same location. Both of these would be considered discrepancies. A person of skill in the art would recognize based on the aforementioned example what further discrepancies would be.

At step 510, when a conflict is found, a determination can be made as to which of the data or the attributes is more restrictive. For example, a more restrictive data or attribute can be one indicating an added signage, a road closure, etc. as previously indicated. In this way, the data or attributes that indicate an added obstacle or restricted movement, and/or add restrictive conditions to vehicle and/or a pedestrian movement within the map zone are considered. At step 512, in order to consolidate/integrate the two map documents into a map update, the more restrictive of the data or attribute can be applied to a base map of the AV in order to generate an updated map. This can be done by performing the same overlaying of data previously discussed where attributes or data are overlaid onto the base map to reflect updates to the map. At step 514, once the updated map is generated, it can be transmitted to downstream modules of the AV to utilize the updated map to operate the AV.

In aspects, in the instance where no conflict is found, both the data in the local map update document and the attributes in the map update document can be applied to the base map to generate the updated map. In this way, all the data and attributes from both documents can be integrated into the updated map. In aspects, the local map update document can be implemented in the same file format as the map update document. For example, the local map update document can be a JSON file, a Protocol Buffers document, or an XML file. In aspects, the transmission of the updated map to the downstream modules can be done based on the same subscription model previously discussed, where the downstream modules subscribe to map client libraries 308 that are configured to push the updated map to the downstream modules when the updated map is generated. In aspects, transmitting the updated map to the downstream modules can be done in real-time after the updated map is generated. In aspects, transmitting the updated map to the downstream modules can be done based on a scheduled time interval. In aspects, updating the local map update document can be done in real-time while the AV is operating.

The aforementioned method 500 takes into account real-time data generated by the AV when generating map updates, such that the map updates can be obtained both via the cloud computing service 302 and from the AV itself. This approach provides a large amount of coverage for obtaining map updates because two sources of updates can be utilized to obtain map updates-one from the cloud computing service 302 and one from the AV itself. This way, there is a bi-directional and multi-source way of obtaining map updates. Additionally, and in further aspects the map updates obtained from the AV can themselves be pushed to the cloud computing service 302, which can itself push those updates to other AVs at a later time. In this way, each AV can contribute to generating map updates for the system 300.

Simulation of Map Updating

Figure 6:
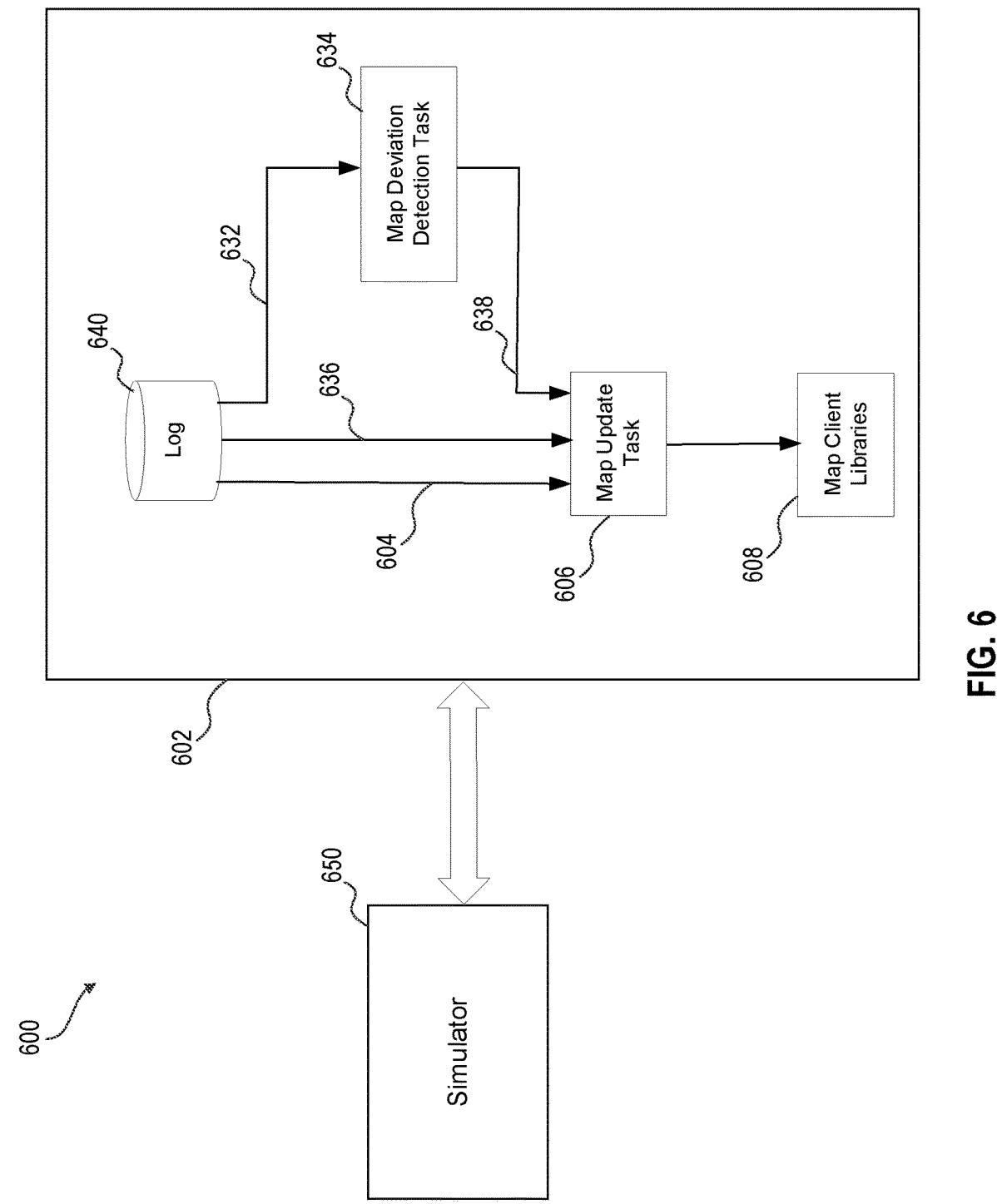
FIG. 6 is a control flow of testing map update functions of an AV system in a simulation, in accordance with aspects of the disclosure.

FIG. 6 is a control flow of a system 600 for testing map update functions of an AV system 602 in a simulation, in accordance with aspects of the disclosure. By way of non-limiting example, AV system 602 may include a system in the AV 102a of FIG. 3, or a subsystem of the system in the AV 102a. In aspects, the AV system 602 can include some or all of the modules of the system in the AV 102a.

In aspects, as shown in FIG. 6, the AV system 602 can include a log 640, a map update task 606, a map deviation detection task 634, and map client libraries 608. In aspects, the log 640 is a storage medium and can be the same (or perform the same or similar functions) as the log 340 in FIG. 3. In aspects, the log 640 can be a storage medium different from the log 340 in FIG. 3 but have a copy of data stored in log 340. In aspects, the map update task 606 and the map deviation detection task 634 can be the same (or perform the same or similar functions) as the map update task 306 and the map deviation detection task 334 in FIG. 3, respectively. In aspects, map client libraries 608 can be one or more of map client libraries 308 in FIG. 3.

During the simulation, the AV system 602 is coupled to a simulator 650, which can use data received by an AV and collected by onboard sensors of the AV during drive tests to test the AV system 602. The simulator 650 can be a computer system that can generate a virtual environment and test performance of the AV system 602 in the virtual environment. In aspects, the virtual environment is a virtual version of the map zone and can be built by using dynamic three-dimensional (3D) models of the roads with various traffic conditions according to information in the base map and other information such as satellite data, data from transport agencies, street cameras, etc. In aspects, the virtual environment can be built by incorporating information collected by the AV at actual scenes on the road. For example, the virtual environment can be incorporate traffic-related features in video footages, images, or other data collected by onboard sensors of the AV during drive tests prior to the simulation. By way of additional example, the virtual environment can incorporate data collected by sensors 332 and stored in the log 340 in FIG. 3.

In aspects, the log 640 can store data collected during drive tests. In aspects, data stored in the log 640 may include map update documents received by the map update task 606 from a cloud computing service and/or from other local tasks (e. g. manual inputs by a driver to update the base map) during drive tests. In aspects, data stored in the log 640 includes information about the map update documents, such as times when map update documents are received during drive tests, sources of map update documents (e.g. the cloud computing service or other local tasks), types and sizes of map update documents, and/or status information about the AV (GPS coordinates, speed, direction, etc.) when receiving map update documents.

In aspects, data stored in the log 640 includes data collected by onboard sensors during drive tests. For example, data stored in the log 640 includes images about the AV's surroundings captured by the sensors 332 during drive tests and stored in the log 340 in FIG. 3. In aspects, the log 640 stores related information about the data collected by onboard sensors, such as the time the data is collected, the source of the data, the type and size of the data, and the status of the AV (GPS coordinates, speed, direction, etc.) when the data is collected. In aspects, the log 640 is coupled to the simulator 650 so that the simulator 650 can visit and pull data stored in the log 640.

In aspects, when the simulation starts, the simulator 650 transmits the base map to the AV system 602. In aspects, during the simulation, the simulator 650 can transmit the map update documents from the log 640 to the map update task 606 via a channel 604. The map update documents transmitted through the channel 604 can be map update documents generated by the cloud computing service during drive tests.

According to the information about map update documents (such as when map update documents are received, the source of map update documents (e. g. cloud computing service 302), the type and size of map update documents, the status of the AV (GPS coordinates, speed, direction, etc.) when receiving the map update documents, etc.) that are also stored in the log 640, the simulator 650 can control how map update documents are transmitted from the log 640 to the map update task 606 through the channel 604, and therefore can simulate a process in regular operations or drive tests, in which map update documents are transmitted from the cloud computing service 302 to the map update task 306 in FIG. 3. For example, when the AV reaches a location in the map zone during a drive test, the map update task 306 receives a map update document from the cloud computing service 302. In the simulation, when the AV system 602 reaches a location in the virtual environment corresponding to the location in the map zone, the simulator 650 can transmit the map update document from the log 640 to the map update task 606.

In aspects, during the simulation, the simulator 650 can transmit the map update documents from the log 640 to map update task 606 via a channel 636. The map update documents transmitted through the channel 636 can be the map update documents generated by the other local tasks during drive tests. According to the information about the map update documents and also stored in the log 640, the simulator 650 can control how map update documents are transmitted from the log 640 to the map update task 606 through the channel 636, and therefore can simulate a process in regular operations or drive tests, in which the map update documents are transmitted from the other local tasks 336 to the map update task 306 in FIG. 3. In aspects, the channel 604 and the channel 636 can be two different channels. In aspects, the channel 604 and the channel 636 can be a same channel.

In aspects, during the simulation, after receiving a map update document from the channel 604 or the channel 636, the map update task 606 processes the map update document in the same manner as described in FIG. 4. For example, the map update task 606 generates a data structure with attributes contained in the map update document, and applies the data structure to update the base map. In aspects, the map update task 606 finds differences between attributes of the base map and attributes contained in the data structure, and replaces the attribute of the base map with attributes contained in the data structure, when a difference is found for the same attribute. In aspects, after the base map is updated, the map update task 606 transmits the base map to map client libraries 608.

In aspects, during the simulation, the simulator 650 can access the map update task 606 and check if the map update task 606 can process the map update document after receiving it. In aspects, the simulator 650 can check if the map update task 606 can parse the map update document, generate a data structure with attributes contained in the map update document, and apply the data structure to update the base map. In aspects, the simulator 650 can check if the map update task 606 can find differences between attributes of the base map and attributes contained in the data structure, and replace the attribute of the base map with attributes contained in the data structure, when a difference is found for the same attribute. In aspects, the simulator 650 can check if the map update task 606 can transmit the updated base map to map client libraries 608. In aspects, the simulator 650 can evaluate the AV system 602 based on whether the map update task 606 can execute operations mentioned above related to updating the base map when receiving the map update document.

In aspects, during the simulation, the map update task 606 can receive map update document not transmitted directly from the log 640, but from the map deviation detection task 634. In aspects, the simulator 650 can transmit data collected by onboard sensors during drive tests from log 640 to the map deviation detection task 634 via a channel 632, according to related information about the data collected by onboard sensors and stored in log 640. For example, the simulator 650 can transmit images captured by onboard sensors from the log 640 to the AV system 602 via the channel 632, according to the times and the locations the images are captured during drive tests, and therefore can simulate how the AV sees its surroundings during drive tests. In aspects, after receiving the data collected by onboard sensors via the channel 632, the map deviation detection task 634 applies algorithms to capture traffic-related features in the data. In aspects, the map deviation detection task 634 compares traffic-related features with the base map, and determine whether traffic-related features deviate from the base map. Once a deviation is detected, the map deviation detection task 634 generates a local map update document and transmit the local map update document to the map update task 606 via a channel 638. In aspects, after receiving the local map update document from the map deviation detection task 634 via the channel 638, the map update task 606 processes the local map update document to update the base map, in a similar manner as the map update task 606 processes the map update documents received from the channels 604 or 636. In aspects, the map update task 606 parses the local map update document, generate a data structure with the attributes contained in the local map update document, and apply the data structure to the base map to generate an updated map. In aspects, after the base map is updated, the map update task 606 transmits the base map to map client libraries 608.

In aspects, during the simulation, the simulator 650 can access the map deviation detection task 634 to check if the map deviation detection task 634 can capture a traffic-related feature in the data transmitted via channel 632. In aspects, the simulator 650 can check if the map deviation detection task 634 can detect deviations by comparing the traffic-related feature with the base map. In aspects, the simulator 650 can check if the map deviation detection task 634 can generate a local map update document after a deviation is detected, and if the map deviation detection task 634 can transmit the local map update document to the map update task 606 via a channel 638. In aspects, the simulator 650 can access the map update task 606 and check if the map update task 606 can process the local map update document after receiving it. In aspects, the simulator 650 can check if the map update task 606 can parse the local map update document, generate a data structure with attributes contained in the local map update document, and apply the data structure to update the base map. In aspects, the simulator 650 can check if the map update task 606 can transmit the updated base map to map client libraries 608. In aspects, the simulator 650 can evaluate the AV system 602 based on whether the map deviation detection task 634 can detect a deviation between traffic-related features with the base map, and whether the map update task 606 can execute operations mentioned above related to updating the base map when a traffic-related feature deviating from the base map is detected.

Figure 7:
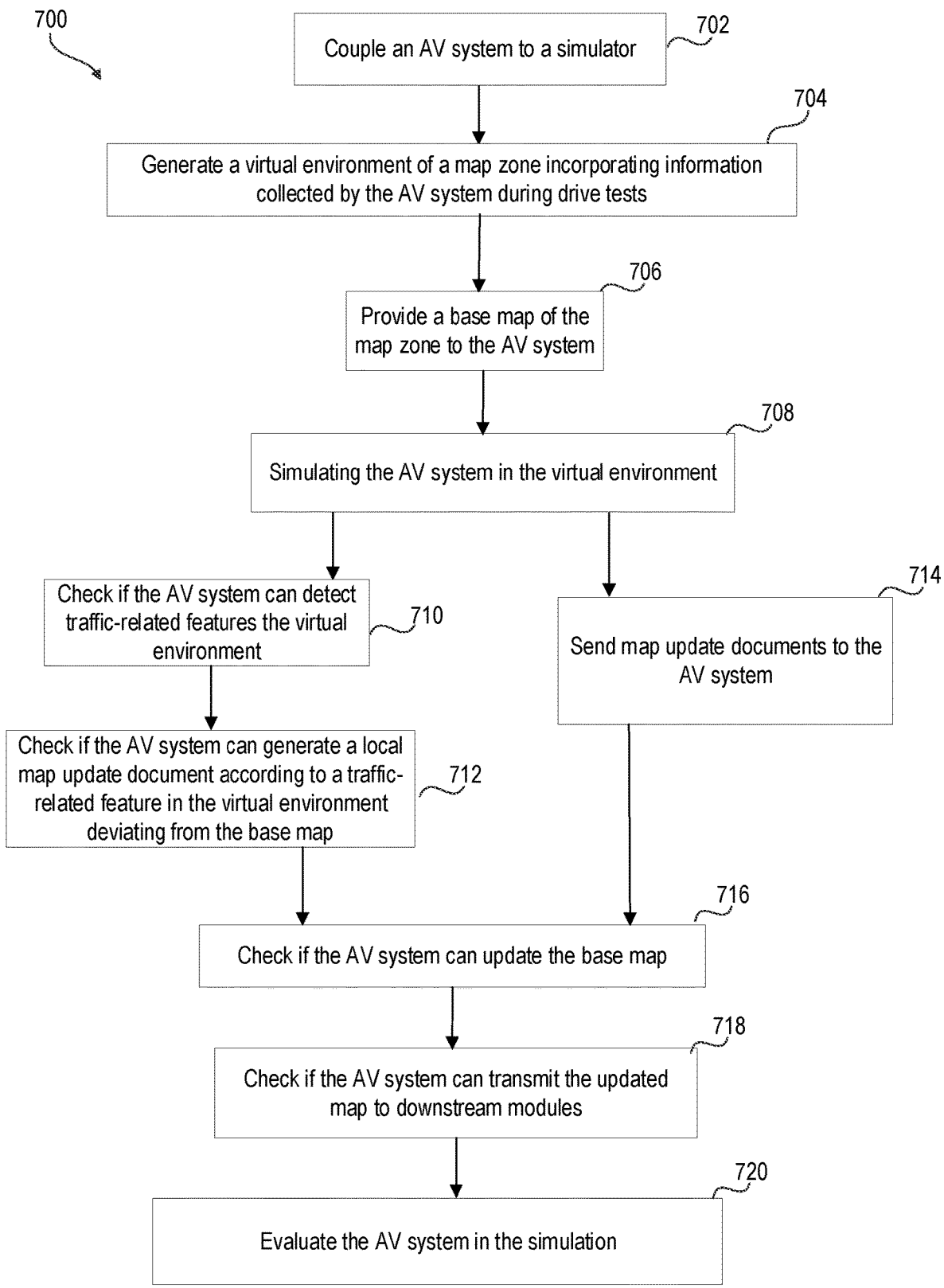
FIG. 7 is a flow chart illustrating steps for testing map update functions of the AV system in a simulation, in accordance with aspects of the disclosure.

FIG. 7 is a flow chart illustrating steps of a method 700 for testing map update functions of an AV system in a simulation, in accordance with aspects of the disclosure. Method 700 may be performed by the components and modules of system 600 of FIG. 6. For example, the simulator 650 can store instructions on a non-transitory computer readable medium and have one or more processors to execute the stored instructions to implement method 700. Method 700 can comprise a series of steps.

At step 702, the AV system is coupled to the simulator, so that the simulator can visit data stored and processed in modules of the AV system, and send commands/instructions to modules of the AV system. For example, as shown in FIG. 6, the simulator can transmit data stored in the log 640 of the AV system to the map update task 636 of the AV system. At step 704, the simulator generates a virtual environment of a map zone, with the virtual environment incorporating information collected by the AV system during drive tests. At step 706, the simulator provides a base map of the map zone to the AV system. At step 708, the simulator starts a simulation of the AV system in the virtual environment.

In aspects, during the simulation, there can be two scenarios under which the AV system updates the base map. In the first scenario, the AV system detects a deviation in the virtual environment away from the base map. At step 710, the simulator checks if the AV system can effectively detect traffic-related features in the virtual environment. At step 712, the simulator checks if the AV system can generate a local map update document after detecting the deviation in the virtual environment. In the second scenario, the AV system receives map update documents collected and stored during drive tests prior to the simulation. At step 714, the simulator sends the map update documents to the AV system. In both scenarios, after the AV system receives a local map update document or a map update document, the AV system updates the base map. At step 716, the simulator checks if the AV system can update the base map, according to the local map update document or the map update document. At step 718, after the AV system updates the base map, the simulator checks if the AV system can transmit the updated map to downstream modules. At step 720, the simulator evaluates the AV system according to performances of the AV system in the above steps checked by the simulator.

In aspects, situation can happen in which the AV system generates a local map update document and receives a map update document at substantially the same time or within a short period of time, before updating the base map. Under such a situation, the AV system makes a determination whether conflicts exist between the data in the local map update document and the attributes in the map update document, or whether conflicts exist between the detected deviation and the map update document. If a conflict is found, the AV system generates an updated map using a more restrictive of the data or attribute, as shown previously in steps 508, 510 and 512 in FIG. 5. In aspects, at step 716, if the conflict is found during the simulation, the simulator can further check if the AV system can update the base map using a more restrictive of the data or attribute.

It has been discovered that the aforementioned method 700 is significantly useful in testing and refining the AV system. Through the simulation, the simulator can apply information and data collected during drive tests to identify potential issues in the AV system that may lead to malfunctioning. This approach provides important information in development stages to correct errors in the AV system and improve performances of the AV system with significant effectiveness and efficiency. According to the issues found during the simulation, the AV system or modules of the AV system can be modified or redesigned, and then be tested in the simulation. This process of simulation-modification can be repeated, and the AV system can be gradually optimized.

Components of the System

Figure 8:
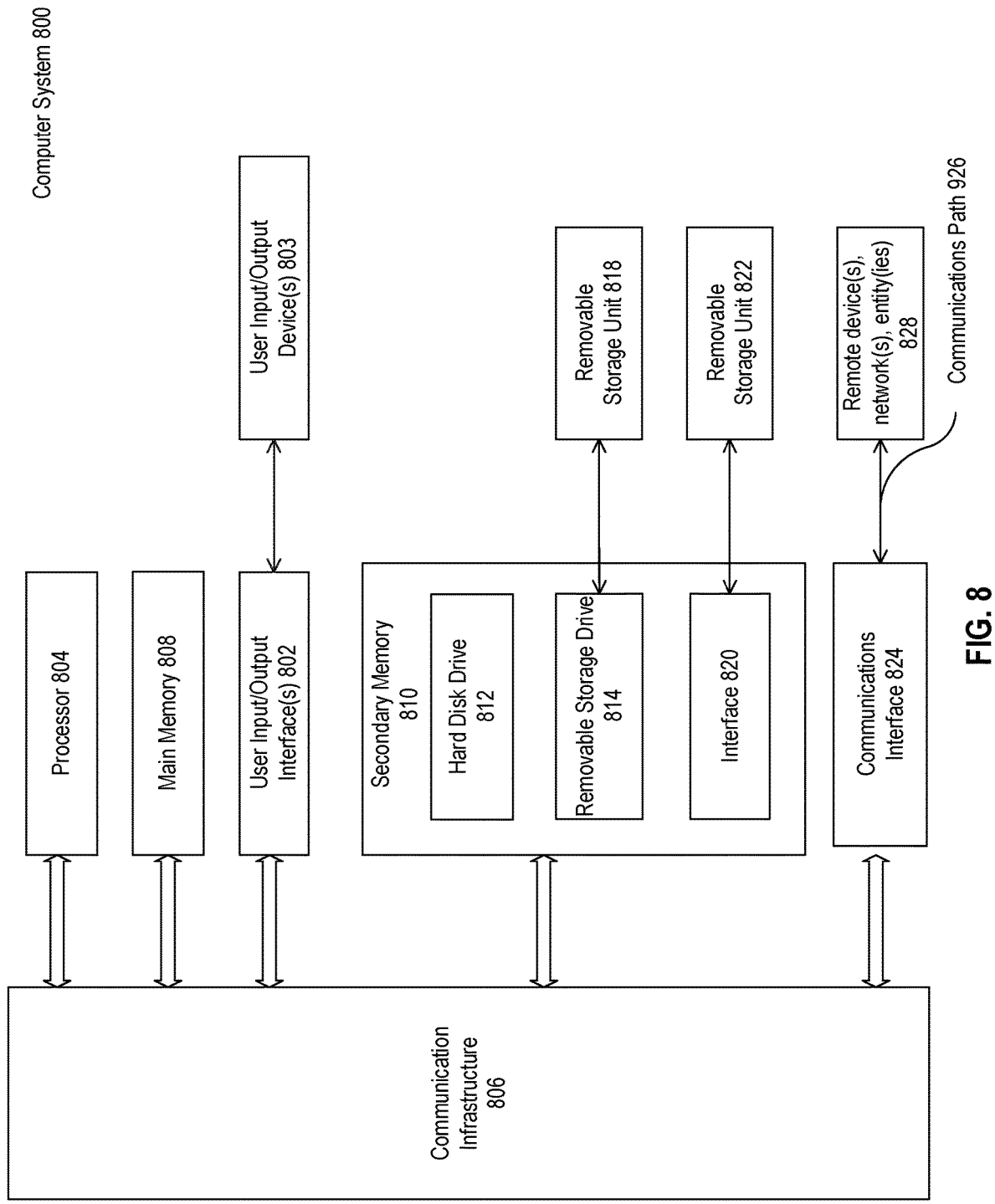
FIG. 8 is an example computing system useful for implementing various aspects, in accordance with aspects of the disclosure.

FIG. 8 is an example computer system 800 useful for implementing system 800, in accordance with aspects of the disclosure. Computer system 800 may be any computer capable of performing the functions described herein. The on-board computing device 220 of FIG. 2 may be implemented using components of the computing system 800. The simulator 602 of FIG. 6 may be implemented using components of the computing system 800.

Computer system 800 includes one or more processors (also called central processing units, or CPUs), such as a processor 804. Processor 804 is connected to a communication infrastructure or bus 806.

One or more processors 804 may each be a graphics processing unit (GPU). In an aspect, a GPU is a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 800 also includes user input/output device(s) 803, such as monitors, keyboards, pointing devices, etc., that communicate with communication infrastructure 806 through user input/output interface(s) 802.

Computer system 800 also includes a main or primary memory 808, such as random access memory (RAM). Main memory 808 may include one or more levels of cache. Main memory 908 has stored therein control logic (i.e., computer software) and/or data.

Computer system 800 may also include one or more secondary storage devices or memory 810. Secondary memory 810 may include, for example, a hard disk drive 812 and/or a removable storage device or drive 814. Removable storage drive 814 may be a floppy disk drive, a magnetic tape drive, a compact disk drive, an optical storage device, tape backup device, and/or any other storage device/drive.

Removable storage drive 814 may interact with a removable storage unit 818. Removable storage unit 818 includes a computer usable or readable storage device having stored thereon computer software (control logic) and/or data. Removable storage unit 818 may be a floppy disk, magnetic tape, compact disk, DVD, optical storage disk, and/any other computer data storage device. Removable storage drive 814 reads from and/or writes to removable storage unit 818 in a well-known manner.

According to an exemplary aspect, secondary memory 810 may include other means, instrumentalities or other approaches for allowing computer programs and/or other instructions and/or data to be accessed by Computer system 800. Such means, instrumentalities or other approaches may include, for example, a removable storage unit 822 and an interface 820. Examples of the removable storage unit 822 and the interface 820 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 800 may further include a communication or network interface 824. Communication interface 824 enables Computer system 800 to communicate and interact with any combination of remote devices, remote networks, remote entities, etc. (individually and collectively referenced by reference number 828). For example, communication interface 824 may allow Computer system 800 to communicate with remote devices 828 over communications path 826, which may be wired and/or wireless, and which may include any combination of LANs, WANs, the Internet, etc. Control logic and/or data may be transmitted to and from Computer system 800 via communication path 826.

In an aspect, a tangible, non-transitory apparatus or article of manufacture comprising a tangible, non-transitory computer useable or readable medium having control logic (software) stored thereon is also referred to herein as a computer program product or program storage device. This includes, but is not limited to, Computer system 800, main memory 808, secondary memory 810, and removable storage units 818 and 822, as well as tangible articles of manufacture embodying any combination of the foregoing. Such control logic, when executed by one or more data processing devices (such as Computer system 800), causes such data processing devices to operate as described herein.

Based on the teachings contained in this disclosure, it will be apparent to persons skilled in the relevant art(s) how to make and use aspects of this disclosure using data processing devices, computer systems and/or computer architectures other than that shown in FIG. 8. In particular, aspects can operate with software, hardware, and/or operating system implementations other than those described herein.

It is to be appreciated that the Detailed Description section, and not any other section, is intended to be used to interpret the claims. Other sections can set forth one or more but not all exemplary aspects as contemplated by the inventor(s), and thus, are not intended to limit this disclosure or the appended claims in any way.

While this disclosure describes exemplary aspects for exemplary fields and applications, it should be understood that the disclosure is not limited thereto. Other aspects and modifications thereto are possible, and are within the scope and spirit of this disclosure. For example, and without limiting the generality of this paragraph, aspects are not limited to the software, hardware, firmware, and/or entities illustrated in the figures and/or described herein. Further, aspects (whether or not explicitly described herein) have significant utility to fields and applications beyond the examples described herein.

Aspects have been described herein with the aid of functional building blocks illustrating the implementation of specified functions and relationships thereof. The boundaries of these functional building blocks have been arbitrarily defined herein for the convenience of the description. Alternate boundaries may be defined as long as the specified functions and relationships (or equivalents thereof) are appropriately performed. Also, alternative aspects can perform functional blocks, steps, operations, methods, etc. using orderings different than those described herein.

References herein to "one aspect," "an aspect," "an example aspect," or similar phrases, indicate that the aspect described can include a particular feature, structure, or characteristic, but every aspect can not necessarily include the particular feature, structure, or characteristic. Moreover, such phrases are not necessarily referring to the same aspect. Further, when a particular feature, structure, or characteristic is described in connection with an aspect, it would be within the knowledge of persons skilled in the relevant art(s) to incorporate such feature, structure, or characteristic into other aspects whether or not explicitly mentioned or described herein. Additionally, some aspects may be described using the expression "coupled" and "connected" along with their derivatives. These terms are not necessarily intended as synonyms for each other. For example, some aspects may be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary aspects, but should be defined only in accordance with the following claims and their equivalents.

What is claimed is:

1. A method, comprising:
generating, by one or more computing devices, a virtual environment of a map zone, wherein the virtual environment comprises information about traffic conditions of the map zone collected during a drive test of an autonomous vehicle (AV) system; and
performing, in the virtual environment, a simulation to test a function of the AV system to update a base map of the map zone, wherein performing the simulation comprises:
providing, by the one or more computing devices, a map update document to the AV system;
checking, by the one or more computing devices, whether the base map of the map zone is updated by the AV system when the AV system receives the map update document;
detecting, by the AV system and in the virtual environment, a deviation between the virtual environment and the base map; and
checking, by the one or more computing devices, whether the base map is updated by the AV system based on the deviation.

2. The method of claim 1, wherein the map update document is generated during the drive test by a cloud computing service.

3. The method of claim 1, further comprising evaluating, by the one or more computing devices, the AV system after checking if the base map is updated by the AV system.

4. The method of claim 1, wherein transmitting the map update document to the AV system comprises transmitting the map update document to the AV system according to information about the map update document, wherein the information about the map update document is collected by the AV system during the drive test.

5. The method of claim 1, wherein checking whether the base map is updated by the AV system when the AV system detects the deviation between the virtual environment and the base map comprises:
checking, by the one or more computing devices, whether a sensor of the AV system detects a feature in the virtual environment, wherein the feature deviates from the base map.

6. The method of claim 1, wherein checking whether the base map is updated by the AV system when the AV system receives the map update document comprises:

checking, by the one or more computing devices, whether the AV system finds a difference between a first attribute in the base map and a second attribute from a data structure generated by the AV system according to the map update document; and checking, by the one or more computing devices, whether the AV system replaces the first attribute in the base map by the second attribute when the difference is found.

7. The method of claim 1, further comprising:
checking, by the one or more computing devices, whether the base map is updated by the AV system when, within a period of time, the AV system receives the map update document and detects a deviation between the virtual environment and the base map, and there is a conflict between the map update document and the deviation.

8. A non-transitory computer readable medium having instructions stored thereon, execution of which, by a computing devices, causes the computing device to perform operations comprising:
generating a virtual environment simulating a map zone, wherein the virtual environment comprises information about traffic conditions of the map zone collected during a drive test of an autonomous vehicle (AV) system; and
testing, in the virtual environment, a function of the AV system to update a base map of the map zone, wherein testing the function comprises:
transmitting a map update document to the AV system;
checking whether the base map of the map zone is updated by the AV system when the AV system receives the map update document;
detecting, by the AV system, a deviation between the virtual environment and the base map; and
checking whether the base map is updated by the AV system based on the deviation.

9. The non-transitory computer readable medium of claim 8, wherein the map update document is generated during the drive test by a cloud computing service.

10. The non-transitory computer readable medium of claim 8, wherein the operations further comprise evaluating the AV system after checking whether the base map is updated by the AV system.

11. The non-transitory computer readable medium of claim 8, wherein transmitting the map update document to the AV system comprises transmitting the map update document to the AV system according to information about the map update document, wherein the information about the map update document is collected during the drive test of the AV system.

12. The non-transitory computer readable medium of claim 8, wherein checking whether the base map is updated by the AV system when the AV system detects a deviation between the virtual environment and the base map comprises:
checking whether a sensor of the AV system detects a feature in the virtual environment wherein the feature is inconsistent with the base map.

13. The non-transitory computer readable medium of claim 8, wherein checking whether the base map is updated by the AV system when the AV system receives the map update document comprises:

checking whether the AV system finds a difference between a first attribute in the base map and a second attribute from a data structure generated by the AV system according to the map update document; and
checking whether the AV system replaces the first attribute in the base map by the second attribute when the difference is found.

14. The non-transitory computer readable medium of claim 8, wherein the operations further comprises:
checking whether the base map is updated by the AV system when, within a period of time, the AV system receives the map update document and detects a deviation between the virtual environment and the base map, and there is a conflict between the map update document and the deviation.

15. A system, comprising:
a storage medium configured to store a map update document and information about traffic conditions of a map zone collected by an autonomous vehicle (AV) system during a drive test; and
one or more computing devices coupled to the storage medium and the AV system, wherein the one or more computing devices are configured to perform operations comprising:
generating a virtual environment simulating the map zone; and
simulating a function of the AV system in the virtual environment, wherein simulating the function comprises:
transmitting, from the storage medium, the information about traffic conditions of a map zone to the virtual environment;
transmitting, from the storage medium, the map update document to the AV system;
checking whether a base map of the map zone is updated by the AV system when the AV system receives the map update document; and
checking whether the base map is updated by the AV system when a sensing unit of the AV system detects a deviation between the virtual environment and the base map.

16. The system of claim 15, wherein the AV system comprises a downstream module and wherein the operations further comprise checking whether the base map is pushed to the downstream module after being updated.

17. The system of claim 15, wherein the map update document is generated during the drive test by a cloud computing service.

18. The system of claim 15, wherein the operations further comprise checking whether a feature about the traffic conditions in the virtual environment is captured by the AV system.

19. The system of claim 15, wherein the operations further comprise checking whether the base map is updated by the AV system when there is a conflict between the map update document and the deviation.

20. The system of claim 15, wherein the operations further comprise evaluating the AV system after checking whether the base map is updated by the AV system.

* * * * *